(12) United States Patent
Liu et al.

(10) Patent No.: US 6,830,372 B2
(45) Date of Patent: Dec. 14, 2004

(54) THERMAL TESTING CONTROL SYSTEM

(75) Inventors: Tai-Sheng Liu, Chung Li (TW); Chi-An Wu, Tao Yuan Shien (TW)

(73) Assignee: Quanta Computer Inc., Taoyuan (TW)

( * ) Notice: Subject to any disclaimer, the term of this patent is extended or adjusted under 35 U.S.C. 154(b) by 0 days.

(21) Appl. No.: 10/330,345

(22) Filed: Dec. 30, 2002

(65) Prior Publication Data

US 2004/0081222 A1 Apr. 29, 2004

(30) Foreign Application Priority Data

Oct. 23, 2002 (TW) .......................................... 91216965

(51) Int. Cl.[7] .............................. G01K 1/14; H05B 1/02
(52) U.S. Cl. ........................ 374/57; 374/45; 73/865.6; 219/209; 219/385; 219/510
(58) Field of Search .......................... 73/865.6; 374/57, 374/45, 141; 324/760; 219/385, 209, 510

(56) References Cited

U.S. PATENT DOCUMENTS

| | | | | |
|---|---|---|---|---|
| 2,510,952 A | * | 6/1950 | Brewster | 374/45 |
| 4,426,619 A | * | 1/1984 | Demand | 324/760 |
| H229 H | * | 3/1987 | Phillips | 73/865.6 |
| 4,967,155 A | * | 10/1990 | Magnuson | 324/760 |
| 5,646,358 A | * | 7/1997 | Tikhtman et al. | 73/865.6 |
| 5,859,409 A | * | 1/1999 | Kim et al. | 324/760 |
| 6,097,001 A | * | 8/2000 | Richardson et al. | 374/57 |
| 6,169,413 B1 | * | 1/2001 | Paek et al. | 324/760 |
| 6,227,701 B1 | * | 5/2001 | Wu | 374/57 |
| 6,526,841 B1 | * | 3/2003 | Wanek et al. | 73/865.6 |
| 6,628,520 B2 | * | 9/2003 | Patel et al. | 324/760 |
| 2003/0112025 A1 | * | 6/2003 | Hamilton et al. | 324/760 |

FOREIGN PATENT DOCUMENTS

| | | | | |
|---|---|---|---|---|
| JP | 0201138 | * | 9/1986 | 73/865.6 |
| SU | 0834951 | * | 5/1981 | 73/865.6 |
| SU | 1714413 A1 | * | 2/1992 | 73/865.6 |

* cited by examiner

Primary Examiner—G. Bradley Bennett
Assistant Examiner—Stanley J. Pruchnic, Jr.
(74) Attorney, Agent, or Firm—Rabin & Berdo, P.C.

(57) ABSTRACT

A thermal testing control system for notebook computers, remotely controlled by a control means, is described. An enclosure can test notebook computers in its inner space under a predetermined temperature. A temperature sensor, mounted in the testing room is electrically connected to the control means. A blower is mounted in one opening, and electrically connected to the control means. If the temperature measured by the temperature sensor is higher than the predetermined temperature, the blower begins to operate.

8 Claims, 4 Drawing Sheets

THERMAL TESTING CONTROL SYSTEM

BACKGROUND OF THE INVENTION

1. Field of Invention

The present invention relates to a thermal testing control system. More particularly, the present invention relates to a thermal testing control system for a notebook computer.

2. Description of Related Art

A conventional thermal testing method for a notebook computer is conducted in a closed space in order to maintain and control the testing temperature. When this kind of thermal testing starts, several notebook computers are turned on simultaneously in a closed space at a predetermined temperature in the closed space. In most cases, the predetermined temperature is higher than room temperature and is adjusted according to testing criteria.

A heater is installed in the thermal testing partition because the temperature needs to be maintained at a predetermined degree. The drawbacks of the conventional testing method are that it occupies a lot of space and consumes a high thermal budget. Besides, since the space is closed, only one predetermined temperature can be executed at one time.

FIG. 1 illustrates a conventional thermal testing space for a notebook. When conventional thermal testing is conducted at the temperature of 40° C., nine sets of notebook computers 12 are put into closed space 10 and the heater 15 maintains the 40° C. temperature. The closed space 10 may be an office partition or a factory partition.

Yet another difficulty is presented by variations in temperature at different points of the office partition or factory partition. The operator conducting this thermal testing may feel uncomfortable at higher temperatures for a long period of time.

SUMMARY OF THE INVENTION

It is therefore an objective of the present invention to provide a thermal testing control system for notebook computers.

In accordance with the foregoing and other objectives of the present invention, a thermal testing control system remotely controlled by a control means is described. An enclosure, in which several computers are tested under a predetermined temperature, has two openings. A temperature sensor in the enclosure is electrically connected to the control means. A blower, installed in one of the two openings, is electrically connected to the control means. When the temperature measured by the sensor is higher than the predetermined temperature, the blower operates.

In one preferred embodiment of the present invention, the enclosure is defined by two layers of PVC plastic wall. The space between the two layers of PVC plastic wall is filled with air in order to isolate thermal propagation among different enclosures.

The sensor in the enclosure measures the temperature and passes the same to the control means. When the temperature measured by the sensor is higher than the predetermined temperature, the blower operates and introduces cooler air to lower the temperature in the enclosure. When the temperature measured by the sensor is equal to or less than the predetermined temperature, the blower stops operating. The mechanism mentioned above is to maintain the predetermined temperature until the thermal testing for notebook is finished.

The method used to lower the enclosure temperature is to mix the cooler air outside the enclosure with the air in the enclosure. The cooler air is introduced into the enclosure by operating the blower installed in an opening.

As embodied and broadly described herein, the invention provides a thermal testing control system to save more space, and allow different tests at different temperatures in different enclosures to take place at the same time. Further, a heater is not essential to raise the temperature in the a enclosure.

It is to be understood that both the foregoing general description and the following detailed description are by examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
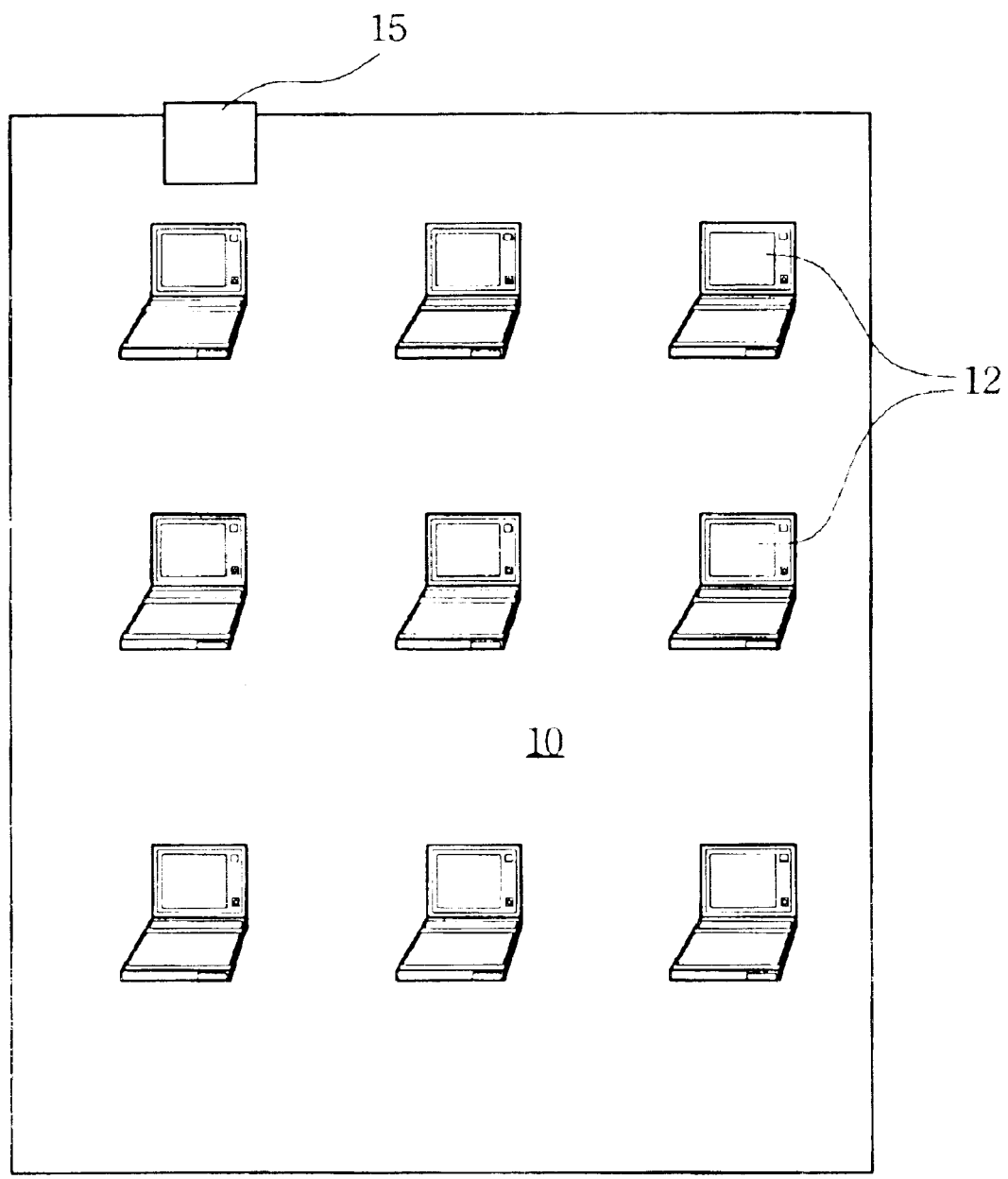
FIG. 1 illustrates a conventional thermal testing partition for notebook computers.

Reference will now be made in detail to the present preferred embodiments of the invention, examples of which are illustrated in the accompanying drawings. Wherever possible, the same reference numbers are used in the drawings and the description to refer to the same or like parts.

In the preferred embodiments of the present invention, a control means electrically connected to several enclosures maintains the enclosures at different predetermined temperatures to conduct thermal testing for notebook.

Figure 2A:
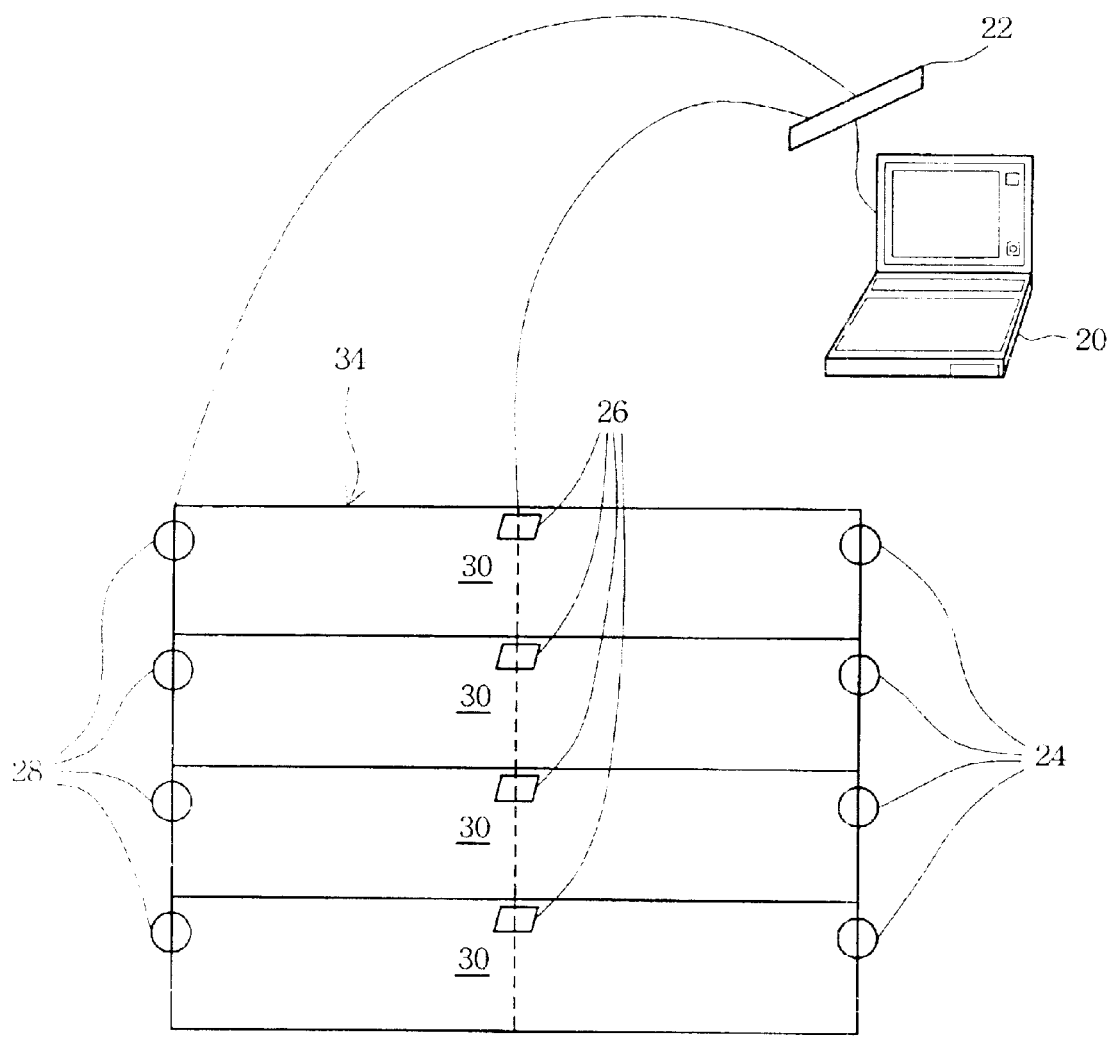
FIG. 2A illustrates a schematic side view for a thermal testing control system according to one preferred embodiment of this invention.
Figure 2B:
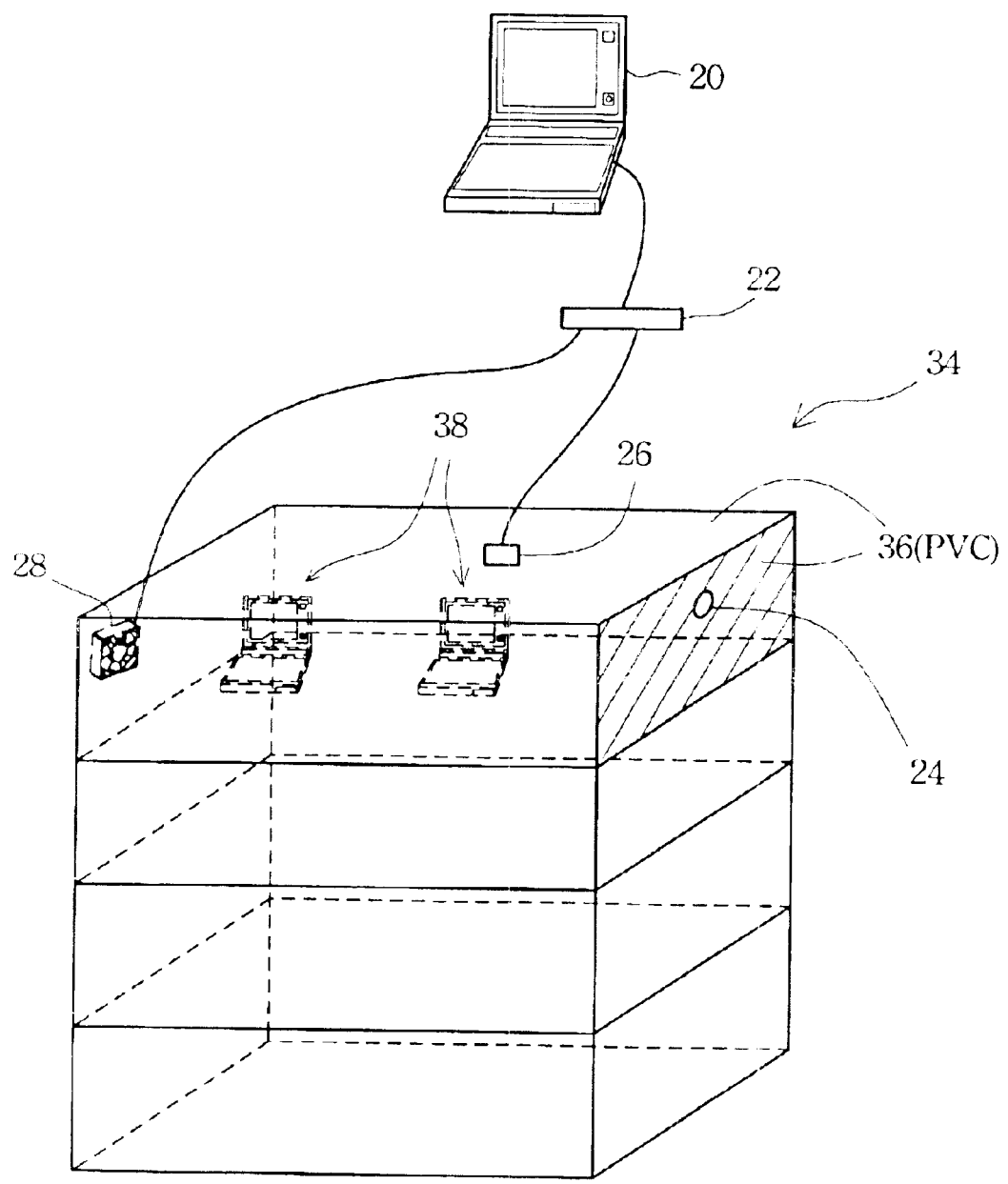
FIG. 2B illustrates a perspective view for a thermal testing control system according to one preferred embodiment of this invention.

FIGS. 2A, 2B respectively illustrate a thermal testing control system's side view and perspective view according to one preferred embodiment of this invention. The thermal testing control system comprises a control means 20, an interface card 22, a temperature sensor 26, a blower 28, a plurality of enclosures 30, a structure frame 34, and sidewalls 36.

Figure 3:
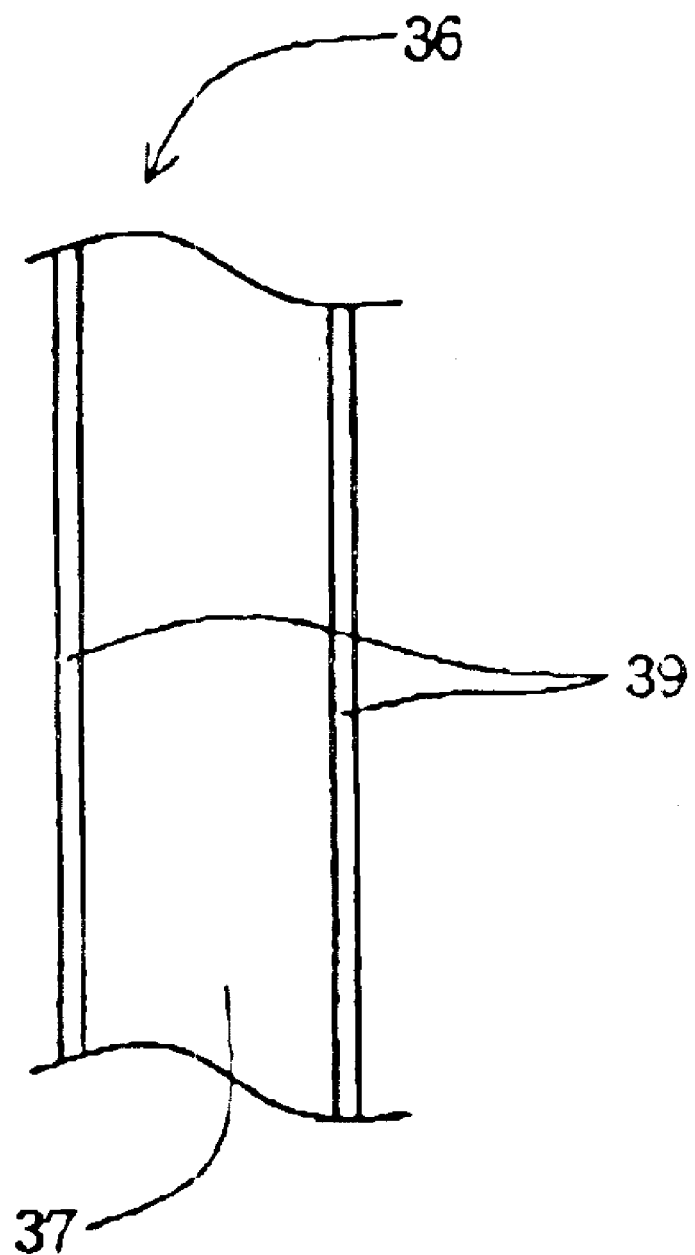
FIG. 3 illustrates a perspective view of a sidewall's structure according to one preferred embodiment of this invention.

The structure frame 34 consists of steel structure and sidewalls 36 (such as PVC plastic wall) which covers all sides of the steel structure to define the enclosures 30. Referring to FIG. 3, two layers of PVC plastic wall 39 are preferably used and the space between the two layers is filled with air 39. The predetermined temperature in different enclosures 30 can be different. Two layers of PVC plastic walls 39 filled with air 37 are good to maintain temperature by isolating heat convection between different enclosures 30.

In addition to PVC plastic walls 36, the enclosure 30 further comprises a heat dissipation device (consists of a blower 28 and an opening 24) and a temperature sensor 26. The blower 28 and the temperature sensor 26 are electrically connected to an interface card 22, respectively. The temperature sensor 26 measures temperatures in each enclosure 30 and passes temperature signals to the control means 20 via the interface card 22. The blower 28 (cooperating with the opening 24) is used to lower temperatures in each enclosure 30. The blower 28 is installed on one side of the PVC plastic walls 36 and the opening 24 is set on the corresponding side of the PVC plastic walls 36 for air convection. When the blower 28 starts operation, the opening 24 (cooperating with the blower 28) is used for air convection.

Both the control means 20 and the interface card 22 control temperatures in each enclosure 30 so that the temperatures can be controlled at different degrees in different enclosures 30. The control means 20 includes desktop computer, notebook computer, or other control means. The interface card 22 is also electrically connected to the control means 20. Alternatively, the control means 20 may comprise the interface card 22 can be integrated in the control means 20.

The function of the blower 28 and the opening 24 is to lower the temperature in enclosure 30 by way of mixing the cooler air outside the enclosure with the air in the enclosure. When the blower 28 starts to operate, cooler air from outside the enclosure can be introduced into the enclosure 30 via the opening 24 (or the blower 28), and hot air can be extracting from the enclosure via the blower 28 (or the opening 24).

The heat for raising the temperature in the enclosure 30 is generated (provided) by notebooks 38 themselves. For example, when a notebook computer 38 runs, there is about 40 percent of the computer power transformed into heat consumption. That is, when a 50W notebook computer 38 runs, about 20W of the 50W power consumption into heat. In a case where five sets of notebook computers 38 placed in the enclosure 30, 100W of heat are provided. The heat provided by the notebook computers can be used to maintain temperatures inside the enclosure 30. Thus, a heater is not needed for thermal testing control system of present invention. The temperature sensor 26, installed in the enclosure 30, measures the temperatures and returns temperature signals back to the control means 20. When the temperature measured by the temperature sensor 26 is higher than a predetermined temperature, the control means 20 controls the blower 28 to turn on and cooler air from outside the enclosure 30 can be introduced into the enclosure 30 to lower the temperature. When the temperature in the enclosure 30 is less than or equal to the predetermined temperature, the control means 20 controls the blower 28 to stop and the notebook computers 38 keep on generating heat. By means of the extra heat provided by notebook computers, the enclosure 30 is maintained at a predetermined temperature until the thermal testing is finished.

In conclusion, an office partition can be divided into several enclosures and offer different temperature testing simultaneously. Additionally, a heater is not essential for raising temperatures. Therefore, a smaller office partition and a lower thermal budget are needed.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A thermal testing control system for computers, comprising:
    a plurality of heating sources for generating heat, said heating sources consisting of said computers, wherein the heat is generated by said computers themselves;
    a control means for setting a predetermined temperature higher than a normal operation temperature of said computers;
    a plurality of sidewalls, defining at least an enclosure, receiving the heat generated by said computers for thermal testing said computers themselves under said predetermined temperature;
    a temperature sensor, electrically connected to said control means and installed in said enclosure; and
    a heat dissipation device, installed in said sidewalls, electrically connected to and controlled by said control means, wherein said heat dissipation device starts to operate when a temperature measured by said temperature sensor is higher than said predetermined temperature, and said heat dissipation device stops operating when the temperature measured by said temperature sensor is equal to said predetermined temperature.

2. The testing control system of claim 1, wherein said heat dissipation device comprises a blower.

3. The testing control system of claim 2, wherein the temperature inside said enclosure is lowered by operating said blower.

4. The testing control system of claim 3, wherein said blower stops operating when the temperature inside said enclosure is less than said predetermined temperature.

5. The testing control system of claim 2, wherein said heat dissipation device further comprises an opening set in said sidewalls corresponding to the blower.

6. The testing control system of claim 1, wherein said sidewalls are made of PVC plastic.

7. The testing control system of claim 1, wherein said sidewalls are made of two layers of PVC plastic walls, and each space between two layers of said PVC plastic walls is filled with air.

8. A temperature maintaining enclosure with at least one sidewall, said temperature maintaining enclosure comprising:
    a plurality of heating sources consisting of computers, said computers generating heat for thermal testing themselves;
    a control means for setting a predetermined temperature higher than a normal operation temperature of said computers;
    a temperature sensor, electrically connected to said control means and installed in said enclosure; and
    a heat dissipation device, installed in said sidewall, and electrically connected to and controlled by said control means, wherein said heat dissipation device starts to operate when a temperature measured by said temperature sensor is higher than said predetermined temperature, and said heat dissipation device stops operating when the temperature measured by said temperature sensor is equal to said predetermined temperature.

* * * * *